United States Patent [19]

Oelsner et al.

[11] 3,853,798

[45] Dec. 10, 1974

[54] BITUMINOUS COMPOSITION

[75] Inventors: Manfred Wolfgang Oelsner, Hamburg; Erich Gunther Zenke, Halstenbek, both of Germany

[73] Assignee: The British Petroleum Company Limited, London, England

[22] Filed: Mar. 22, 1972

[21] Appl. No.: 236,984

[30] Foreign Application Priority Data
Mar. 31, 1971 Germany............................ 2115475

[52] U.S. Cl...................... 260/28.5 AS, 260/28.5 B
[51] Int. Cl. ............................................. C08f 45/52
[58] Field of Search................. 260/28.5 B, 28.5 AS

[56] References Cited
UNITED STATES PATENTS
2,909,498   10/1959   Sayko ........................ 260/28.5 AS
3,637,558   1/1972   Verdol et al................. 260/28.5 AS
3,651,000   3/1972   Woodruff..................... 260/28.5 AS Primary Examiner—Morris Liebman
Assistant Examiner—S. L. Fox

[57] ABSTRACT

A bituminous composition is prepared by blending bitumen, an aromatic flux oil and an E P T rubber latex and blowing the mixture.

The resulting composition is homogeneous and even when stored hot, little or no separation of the components take place. It is particularly suitable for use as a roofing or sealing material.

10 Claims, No Drawings

BITUMINOUS COMPOSITION

This invention relates to a method for preparing a bituminous composition. The terms "bituminous composition," "bituminous substance" and "bitumen," as used in the specification, shall be understood to have the meaning "asphaltic composition," "asphaltic substance" and "asphalt," respectively, in accordance with the definition ASTMD8–55 established for "asphalt" by the American Society for Testing Materials.

Our co-pending British Patent Application 42508/70 which corresponds to copending U.S. Pat. application Ser. No. 71,196 claims a method of preparing a bituminous composition, suitable for use as a roof surfacing material, in which a mixture of:

23 – 88% wt., based on the total mixture, of a bituminous substance,
2 – 25% wt., based on the total mixture, of a rubber,
10 – 75% wt., based on the total mixture, of a flux oil for extending the rubber,
0 – 4 parts by weight sulphur per 100 parts by weight of the rubber, and
0 – 3% wt., based on the total mixture, of a polyolefin, is blown with a gas which contains elemental oxygen at a temperature of 150° – 300°C.

In application 42508/70, lumps of the elastomer are initially mixed with the flux oil by milling and the resulting elastomer/oil blend is then added to the bitumen.

We have now discovered that the elastomer can be added to the bitumen in latex form, thereby simplifying the process technology.

Thus according to the present invention there is provided a process for the production of a bituminous composition in which a mixture of:

10 – 85% wt. based on the total mixture, of a bituminous substance,
5 – 25% wt., based on the total mixture of an elastomer derived from ethylene, propylene and an unsaturated hydrocarbon with more than 1 olefinic double bond,
10 – 85% wt., based on the total mixture of a flux oil for extending the elastomer, is blown at 180° – 260°C with a gas which contains elemental oxygen, the elastomer being in the latex form when added to the bitumen.

The bitumen and the flux oil are preferably blended together before the elastomer latex is added.

The latex may be incorporated into the bitumen/flux oil blend by stirring or, preferably, by blowing under milder conditions than those required to form the final composition.

Suitable elastomers are copolymers of ethylene, propylene and cyclic unsaturated hydrocarbons with more than 1 olefin double bond and also an endocyclic bridge of 1 or more methylene groups.

Preferred elastomers are those derived from ethylene, propylene and dicyclopentadiene.

Suitable latices contain, for example 40 – 60% wt. elastomer, but other concentrations may also be employed.

The latices are added in quantities which correspond to the desired concentrations of elastomer in the mixtures for blowing. This concentration is preferably 5 – 15% wt.

The flux oils most suitable for use in the process according to the invention are those known in the petroleum industry as "Aromatic Extracts". These are the fractions produced by treating vacuum distillates and de-asphalted vacuum residues with solvents selective for the aromatic components. The solvents commonly used include furfural, sulphur dioxide and phenol.

Aromatic extracts obtained during the production of lubricating oils are particularly suitable.

Before the addition of the elastomer latex, the bitumen, which is preferably blended with the flux oil, is suitably heated to 150° – 260°C, preferably to 180° – 230°C.

During the addition, the temperature should not sink appreciably below 150°, or the mixture will become too viscous and also the evaporation of the water contained in the latex will not take place with sufficient rapidity.

Preferably the temperature of the blend is raised during the addition of the latex by supplying heat, so that at the end of the addition, the blowing temperature of the mixture will be reached.

Preferably the blowing of the composition is carried out in two stages. The first stage (initial blowing) is preferably carried out at 180° – 230°C and the second stage at 230° – 260°C. The initial blowing is particularly advisable if the bituminous substance tends to oxidise rapidly.

The blowing time will usually be in the range 8 – 20 hours. It depends on the type and consistency of the bitumen used, on the type of flux oil, on the relative proportion of the components of the mixture, on the rate of air blowing and also on the desired properties of the end product.

Sulphur may be added to the blends and, if so, further improvements in elasticity and homogeneity are achieved.

When sulphur is used it may be added before, during or after the blowing. Suitable concentrations of sulphur are 0.5 – 4 parts by weight sulphur to 100 parts by weight of elastomer.

The blown elastomerised bitumen is homogeneous and, even when stored hot, little or no separation of the components takes place. It has marked elastic properties and is particularly suitable for use as a sealing material, pipe wrapping impregnating compound or pipe lining compound, for the production of bitumen paints, insulating materials for the electrical engineering industry, for the production of flexible roofing felt, for the production of water proofing felt and for heat and sound insulating materials. It can also be used as a concentrate and blended with unblown bitumen as disclosed in our co-pending British Application (BP Case No. HAM 2929/PAT 34) which corresponds to co-pending U.S. Pat. application Ser. No. 231,023 to provide paving grade bitumen.

The invention is illustrated with reference to the following Examples.

EXAMPLES

The following Table gives details of feed stocks, experimental conditions and products for three compositions.

At the end of the table, data are provided on comparitive products prepared by the method disclosed in Application No. 42508/70 in which the elastomer originally present in the form of lumps was milled with the flux oil at elevated temperature and the resulting mixture was blended with bitumen before blowing.

Table

| Example | | 1 | 2 | 3 |
|---|---|---|---|---|
| Latex | | | | |
| Quantity | g | 703 | 445 | 445 |
| Elastomer concentration | per cent by weight | 57 | 45 | 45 |
| Composition of the bitumen/extract/elastomer mixture | | | | |
| Bitumen | per cent by weight | 40 | 60 | 60 |
| Aromatic extract | per cent by weight | 50 | 30 | 30 |
| Elastomer | per cent by weight | 10 | 10 | 10 |
| Quantity of bitumen/extract/elastomer mixture | kg | 4 | 2 | 2 |
| Test Conditions | | | | |
| Mixing in of elastomer by means of a quantity of air, reckoned on bitumen/extract mixture | $m^3$ per hr.kg. | Air 0.3 | Air 0.3 | Stirrer — |
| Speed of stirrer | r.p.m. | — | — | 700 |
| Time of latex addition | mins. | 60 | 20 | 20 |
| Duration of tests | mins. | 80 | 30 | 30 |
| Temperature before addition of latex | °C | 230 | 240 | 240 |
| Temperature after addition of latex | °C | 190 | 190 | 190 |
| Temperature at the end of the test | °C | 220 | 220 | 220 |
| Analytical data of the bitumen/extract/elastomer mixture | | | | |
| Softening point, ball and ring | °C | 52.5 | 60 | 59 |
| Penetration at 25°C | mm/10 | 317 | 210 | 220 |
| Analytical data of comparison mixtures (no latex, mixing in of elastomer in the mill) | | | | |
| Softening point, ball and ring | °C | 51 | 59 | 59 |
| Penetration at 25°C | mm/10 | 327 | 215 | 215 |

The elastomer contained in the latices was a copolymer of ethylene, propylene and dicyclopentadiene having a Mooney viscosity of 70.

The aromatic flux oil was obtained by furfural extraction of a lubricating oil base stock intermediate. It had a viscosity E/50°C of 75.

The bitumen was derived from a Tia Juana crude oil. It had a penetration of 185 mm/10 at 25°C and a softening point of 41°C.

The latex was added over the stated time to a preheated mixture of bitumen and aromatic extract in a vessel fitted with a stirrer and a nozzle for blowing in air.

At the specified rates of addition, only a thin layer of foam was formed. No coagulated elastomer was found at the end of the experiments.

During the addition of the latex the vessel was heated.

After the addition of latex, the mixtures were still blown for a short time with air or stirred. When removed from the vessel, the mixtures were homogeneous – no coagulated elastomer fractions could be observed.

The products according to the invention in which the elastomer had been added in latex form were compared with products in which large lumps of elastomer had been milled in the presence of the flux oil. The properties were very similar.

We claim:

1. A process for the production of an asphaltic composition which comprises:
   1. forming a mixture of:
      10–85% wt., based on the total mixture, of an asphalt
      5–25% wt., based on the total mixture, of an elastomer which is a copolymer of ethylene, propylene and a cyclic unsaturated hydrocarbon having more than one olefinic double bond and having also an endocyclic bridge containing at least one methylene group, and
      10–85% wt., based on the total mixture, of a flux oil for extending the elastomer, and
   2. blowing the mixture at 180°–260°C with a gas which contains elemental oxygen, the elastomer being in latex form when added to the asphalt.

2. A process according to claim 1 in which the asphalt and the flux oil are blended together before the elastomer latex is added.

3. A process according to claim 2 wherein the elastomer latex is incorporated into the blended asphalt/flux oil by blowing under milder conditions than those required to form the final composition.

4. A process according to claim 1 wherein the elastomer latex is a copolymer of ethylene, propylene and dicyclopentadiene.

5. A process according to claim 1 wherein the flux oil is an aromatic extract.

6. A process according to claim 1 wherein the asphalt is heated to 150°–260°C before addition of the elastomer latex.

7. A process according to claim 6 wherein the asphalt is heated to 180°–230°C before addition of the elastomer latex.

8. A process according to claim 1 wherein the blowing of the composition is carried out in two stages.

9. A process according to claim 8 wherein the first stage is carried out at 180° – 230°C.

10. A process according to claim 9 wherein the second stage is carried out at 230° – 260°C.

* * * * *